United States Patent
Dunn et al.

(10) Patent No.: US 9,584,336 B2
(45) Date of Patent: Feb. 28, 2017

(54) USING A CONTROL PANEL AS A WIRELESS ACCESS POINT

(71) Applicant: Vivint, Inc., Provo, UT (US)

(72) Inventors: Alex J. Dunn, Orem, UT (US); Christopher Lee Harris, Holladay, UT (US); Bruce Ehlers, Provo, UT (US); Todd M. Santiago, Orem, UT (US); James E. Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 68 days.

(21) Appl. No.: 14/211,344

(22) Filed: Mar. 14, 2014

(65) Prior Publication Data

US 2014/0269660 A1    Sep. 18, 2014

Related U.S. Application Data

(60) Provisional application No. 61/791,316, filed on Mar. 15, 2013.

(51) Int. Cl.
*H04L 12/28* (2006.01)
*H04L 29/08* (2006.01)
*H04L 29/06* (2006.01)

(52) U.S. Cl.
CPC .......... *H04L 12/283* (2013.01); *H04L 12/282* (2013.01); *H04L 67/125* (2013.01);
(Continued)

(58) Field of Classification Search
CPC .................................................. H04L 12/283
(Continued)

(56) References Cited

U.S. PATENT DOCUMENTS 6,466,971 B1 * 10/2002 Humpleman et al. ........ 709/220
7,043,532 B1 *  5/2006 Humpleman et al. ........ 709/208
(Continued)

FOREIGN PATENT DOCUMENTS

JP    2002352065    12/2002
JP    2009500714     1/2009
(Continued)

OTHER PUBLICATIONS

"MACworld super guides iPhone 5 superguide", published in Jan. 24, 2013.*
(Continued)

*Primary Examiner* — Parth Patel
(74) *Attorney, Agent, or Firm* — Holland & Hart LLP

(57) ABSTRACT

A method for providing wireless access to one or more wireless devices using an automation system control panel is described. In one embodiment, a communication link is established between an automation system control panel and one or more automation components. Settings are applied to configure the automation system control panel for use as a wireless access point providing two-way communication with one or more electronic devices. Applying settings includes receiving input directly at a graphical user interface of the automation system control panel, the graphical user interface further providing access to control the one or more automation components. The automation system control panel is wirelessly connected to one or more electronic devices via a wireless access point interface using the settings applied at the graphical user interface.

20 Claims, 9 Drawing Sheets

(52) U.S. Cl.
CPC .............. *H04L 67/36* (2013.01); *H04L 69/18* (2013.01); *H04L 2012/285* (2013.01); *H04L 2012/2841* (2013.01)

(58) Field of Classification Search
USPC ........ 370/338; 709/224, 223, 203, 208, 217, 709/220
See application file for complete search history.

(56) References Cited

U.S. PATENT DOCUMENTS

| | | | |
|---|---|---|---|
| 7,512,402 B2* | 3/2009 | Narayanaswami et al. .. | 455/420 |
| 8,504,842 B1* | 8/2013 | Meacham ..................... | 713/183 |
| 8,538,407 B2* | 9/2013 | Addy ............................ | 455/420 |
| 8,539,093 B2* | 9/2013 | Forstall et al. ............... | 709/232 |
| 2004/0260407 A1* | 12/2004 | Wimsatt ........................ | 700/19 |
| 2005/0040943 A1 | 2/2005 | Winick | |
| 2005/0085928 A1* | 4/2005 | Shani ............................. | 700/18 |
| 2005/0131551 A1* | 6/2005 | Ruutu et al. ...................... | 700/1 |
| 2005/0204036 A1* | 9/2005 | Farhat ................. | H04L 41/5009 709/224 |
| 2005/0256983 A1* | 11/2005 | Ma ........................ | G06F 13/385 710/62 |
| 2005/0270151 A1* | 12/2005 | Winick ................ | F24F 11/0086 340/539.1 |
| 2006/0031457 A1* | 2/2006 | Motoyama .......... | H04L 12/2803 709/224 |
| 2006/0184998 A1* | 8/2006 | Smith ................. | H04L 12/4679 726/3 |
| 2007/0293208 A1* | 12/2007 | Loh ...................... | H04L 12/282 455/419 |
| 2008/0209034 A1* | 8/2008 | Shin et al. .................... | 709/224 |
| 2009/0047992 A1* | 2/2009 | Ortiz et al. ................. | 455/552.1 |
| 2009/0180430 A1* | 7/2009 | Fadell ................. | H04L 12/5695 370/329 |
| 2010/0020746 A1* | 1/2010 | Zaks ...................... | G06Q 30/02 370/328 |
| 2010/0023865 A1* | 1/2010 | Fulker et al. ................. | 715/734 |
| 2010/0267368 A1* | 10/2010 | Masputra .......... | H04M 1/72527 455/414.1 |
| 2010/0313225 A1* | 12/2010 | Cholas et al. .................. | 725/62 |
| 2011/0113360 A1* | 5/2011 | Johnson et al. .............. | 715/771 |
| 2011/0154405 A1* | 6/2011 | Isaias ................. | H04N 5/44513 725/53 |
| 2011/0202910 A1* | 8/2011 | Venkatakrishnan et al. . | 717/171 |
| 2012/0102543 A1* | 4/2012 | Kohli et al. ....................... | 726/1 |
| 2012/0110640 A1* | 5/2012 | Donelson ............. | H04W 12/08 726/3 |
| 2012/0164989 A1* | 6/2012 | Xiao et al. ................. | 455/414.1 |
| 2012/0215725 A1* | 8/2012 | Imes et al. ...................... | 705/412 |
| 2012/0278738 A1* | 11/2012 | Kruse .................... | G06Q 10/10 715/754 |
| 2012/0282974 A1* | 11/2012 | Green et al. ................. | 455/550.1 |
| 2013/0079903 A1* | 3/2013 | Kemmann et al. ............. | 700/83 |
| 2013/0217361 A1* | 8/2013 | Mohammed et al. ........ | 455/411 |
| 2013/0325190 A1* | 12/2013 | Imes et al. .................... | 700/276 |
| 2014/0059466 A1* | 2/2014 | Mairs et al. .................. | 715/771 |
| 2014/0191848 A1* | 7/2014 | Imes et al. .................... | 340/10.5 |
| 2014/0201072 A1* | 7/2014 | Reeser ................. | G08B 25/001 705/40 |
| 2014/0278028 A1* | 9/2014 | Nye et al. ..................... | 701/117 |

FOREIGN PATENT DOCUMENTS

| | | |
|---|---|---|
| KR | 1020010043328 | 5/2001 |
| WO | 2007004755 | 1/2007 |
| WO | 2008/097992 | 8/2008 |
| WO | 2010144453 | 12/2010 |

OTHER PUBLICATIONS

Internet Archieve wayback Machine for above "U" reference is provided for data Jan. 24, 2013 publication.*
International Search Report for PCT/US2014/028405. Jul. 24, 2014.
English translation of the specification and claims and English abstract of JP2002352065. Dec. 6, 2002.

* cited by examiner

USING A CONTROL PANEL AS A WIRELESS ACCESS POINT

CROSS-REFERENCE TO RELATED APPLICATIONS

The present Application claims priority to U.S. Provisional Patent Application No. 61/791,316, titled: "Methods For Using A Home Automation Control Panel As A Wireless Access Point, And Systems And Devices Related Thereto," filed on Mar. 15, 2013.

TECHNICAL FIELD

The present disclosure relates to wireless communication. More particularly, embodiments of the present disclosure relate to the use of control panels for home automation systems for wireless communication. More particularly still, embodiments of the present disclosure relate to control panels in a home or commercial setting that may be used as a wireless access point for connecting electronic devices to a communication network.

BACKGROUND

With the advances in computing and communication technologies, consumers are increasingly provided with different options for accessing communication networks (e.g., the Internet, a LAN, etc.). Whereas in the past a consumer may have a home or office computer dedicated to interacting with a particular network, the same consumer may now have two, three or even more devices that the user may use to connect to a single network. For instance, in addition to a home computer that is connected to the Internet or another communication network, a consumer may also have a laptop, a smart phone, a tablet computing device, an e-reader, or other similar devices, each of which can connect to, and communicate through, the communication network.

Electronic devices may also make use of different wireless technologies to communicate in a communication network. As an example, so-called smart phones may use certain mobile communication networks (e.g., CDMA, GSM, LTE, HSPA+, etc.) to communicate with a service provider who then provides access to the Internet or another network. A security or home automation system may use a mesh network protocol (e.g., Z-Wave, Zigbee, etc.). Other devices may use still other technologies, including WiFi (i.e., IEEE 802.11 technologies). Each communication protocol may have different advantages or disadvantages with respect to range, infrastructure cost, bandwidth, and the like.

As an example, home automation systems are increasingly being used by consumers to provide home security and to automate other functions within a home or commercial setting. For instance, a home owner may use a home automation system to arm different security sensors, and/or to control functions such as lighting, heating, audio and entertainment systems, and the like. In such a system, a control panel may be used. The control panel may include a short-range, low-power, low bandwidth radio. Only some home automation components (e.g., sensors, cameras, etc.) may be in range of the control panel, however, the home automation components may communicate with each other to forward communications to or from a control panel.

In contrast, a home, office, hotel, or other network for accessing the Internet may utilize a higher bandwidth. WiFi is often the preferred communication protocol for such networks. In general, a network at a physical location may include a modem connected to an Internet service provider. A router may then connect to the modem to allow multiple devices to connect to the Internet. One or more wireless access points may also be connected to the router. The access points may include WiFi radios to communicate wirelessly with different computing devices. Thus, a laptop, desktop, tablet, e-reader, smart phone, or other computing device with WiFi could connect to the access point and ultimately to the Internet (e.g., through the router and modem).

While access points may provide large numbers of devices with access to a single network connection, setting up an access point is often complicated and inconvenient, particularly for novices. For instance, access points typically do not include displays or other user interfaces. As a result, a user may be required to connect a computer to the access point using a hard-wired connection. The user may then be required to install software, or navigate to a particular location that allows use of firmware on the access point, so as to input relevant settings (e.g., IP address, SSID, security information, channel, band, etc.) that allow other devices to connect wirelessly to the access point.

SUMMARY

According to at least one embodiment, a control panel for an automation system is also described. The control panel may include a housing and one or more processors for controlling operation of a control panel for at least one of a security system and a building automation system, the one or more processors carried within the housing. The control panel may include a first communication interface for enabling the control panel to connect to a plurality of wireless devices as a wireless access point. The first communication interface may be carried by or within the housing, and configured to provide the plurality of wireless devices access to the communication network accessible through the first communication interface. The control panel may include a second communication interface for communicatively coupling the one or more processors to the communication network, the second communication interface being carried by or within the housing. The control panel may include a graphical user interface carried by the housing and in communication with the one or more processors for enabling control of the first communication interface and the security system or building automation system.

In one embodiment, the communication network may include the Internet. In some cases, the first communication network includes one or more of a cable, DSL, or satellite connection to an Internet service provider. The first communication interface may use a WiFi protocol. The first and second communication interfaces may use different communication protocols. The control panel may include a third communication interface for coupling the one or more processors to a network of security system or building automation components. The third communication interface may be configured to couple the one or more processors to a mesh network of security or building automation components. The second communication interface may use one or more of a mesh network protocol or a mobile telephone system protocol.

An automation system is also described. In one embodiment, the automation system may include at least one automation component for a security system or building automation system and a control panel dedicated for use in controlling or monitoring the at least one automation component. The control panel may include at least one of a housing, one or more processors carried within the housing, an interface carried within the housing for wirelessly connecting the control panel to the at least one automation component, a wireless access point interface for wirelessly connecting the control panel to a plurality of WiFi-enabled devices, and a graphical user interface carried by the housing and in communication with the one or more processors for enabling control of the wireless access interface and the at least one automation component.

In one embodiment, the at least one automation component may be a security-related automation component. In some cases a router and/or a modem may be connected to the control panel and provide access to an Internet service provider. The plurality of WiFi-enabled devices may be provided access to the Internet service provider through the wireless access point interface and the router and/or modem. The control panel may include a mobile telephone network interface connecting the control panel to the mobile telephone network. The mobile telephone network interface may provide the control panel access to a network operations center. The graphical user interface may include a display configured to display setup or configuration information corresponding to the wireless access point interface. In some cases, the control panel may include an input for the control panel to receive setup or configuration information corresponding to the wireless access point interface directly at the control panel.

According to at least one embodiment, a method for providing wireless access to one or more wireless devices using an automation system control panel is described. In one embodiment, a communication link may be established between an automation system control panel and one or more automation components. Settings may be applied to configure the automation system control panel for use as a wireless access point providing two-way communication with one or more electronic devices. Applying settings may include receiving input directly at a graphical user interface of the automation system control panel, the graphical user interface further providing access to control the one or more automation components. The automation system control panel may be wirelessly connected to one or more electronic devices via a wireless access point interface using the settings applied at the graphical user interface.

In one embodiment, wirelessly connecting the automation system control panel to one or more electronic devices may include establishing a WiFi connection. In some cases, the automation system control panel may be connected to a router or modem for accessing an Internet service provider. A communication link may be established between the automation system control panel and the one or more automation components and wirelessly connecting the automation system control panel to one or more electronic devices uses at least two different wireless communication interfaces.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

DETAILED DESCRIPTION

Figure 1:
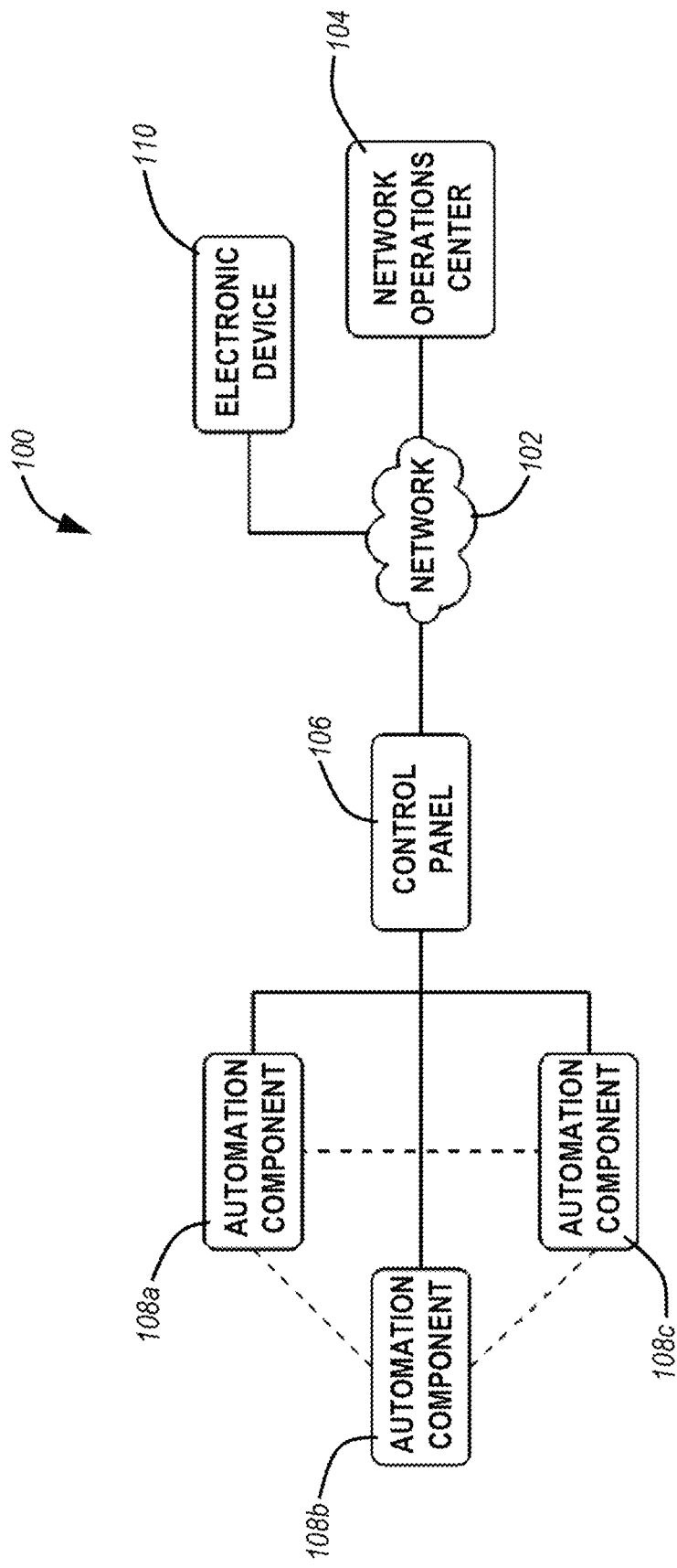
FIG. 1 is a schematic illustration of an example automation system, the automation system including a control panel capable of connecting to one or more automation components and a network operations center.

In accordance with aspects of the present disclosure, embodiments of methods, systems, software, computer-program products, and the like are described or would be understood and which relate to use of an automation system control panel as a wireless access point. A security system or other automation system may include a control panel monitoring operation and/or status of one or more sensors, cameras, or other automation components within a residential or commercial location. The control panel may also be connected to an external communication network, such as the Internet, and operate as a wireless access point. In a particular example, one or more computing devices may connect to the control panel through its function as a wireless access point, and thus also connect to the Internet through the control panel. In some embodiments, one or more automation components may connect to the control panel in its function as a wireless access point.

An example device of some embodiments of the present disclosure includes a control panel for an automation system. The control panel includes one or more processors which communicate with one or more communication interfaces. A first communication interface may couple the processors to one communication network. A second communication interface may couple the processors to multiple wireless devices. The second communication interface allows the control panel to act as a wireless access point and to provide the wireless devices access to the communication network accessible through the first communication network. The first communication network may include connections to one or more automation components connectable to the control panel, a network coupling the control panel to a network operations center, or a global network such as the Internet, which connection may be provided through an Internet service provider.

An example control panel may include multiple interfaces to connect to the multiple different networks that may be available. One interface may use a mesh network protocol to communicate with security or other home automation components. A second interface may use a radio component to communicate with a mobile telephone network. A third interface may connect to a router, modem or other similar component which provides access to an Internet service provider. A fourth interface may be used as the wireless access point interface to connect the control panel to one or more wireless devices. The fourth interface may use a WiFi protocol.

Some embodiments include an automation system for a residential or commercial location. The automation system includes at least one automation component and a control panel for use in controlling and/or monitoring the at least one automation component. The control panel includes one interface connecting the control panel to the automation component and allowing monitoring and/or control thereof. The control panel also includes a wireless access point interface wirelessly for connecting the control panel to multiple WiFi-enabled devices.

The WiFi-enabled devices connected to a control panel dedicated for use with automation components may include computing devices, including mobile phones, laptop computers, desktop computers, tablet computing devices, and the like. Automation components connected through the wireless access point interface or through a separate connection may be used for security, heating and air conditioning, entertainment, sprinkler systems, and the like.

Methods are also provided for providing wireless access to various wireless devices. In an example method, a control panel for an automation system is linked to one or more automation components. Configuration settings are applied to allow the wireless access point to engage in two way communication with one or more electronic devices. The control panel is then connected wirelessly to the electronic devices.

Systems, devices and methods according to the present disclosure are configured for use in connection with residential and/or commercial communication and home automation systems. Without limiting the scope of the present disclosure, a home or business may use an automation system to monitor security, lighting, heating and air conditioning (HVAC), telephone systems, or other components of a building. A security system may, for instance, provide added safety to residents or patrons, or protect valuable property. Automated control of other systems and components (e.g., lighting components, sprinkler systems, HVAC components, audio/video systems, etc.) may also allow a user to efficiently monitor and control multiple systems from a single interface, thereby saving time and effort. Additionally, automated control of such systems may reduce demands on electricity, water, and the like, thereby reducing the associated costs to the user. For convenience, automation systems may be referred to herein as "home automation systems" and respective security or other components as "home automation components;" however, such systems may be used for any type of location, including commercial and residential locations.

Turning now to FIG. 1, an example distributed system 100 is shown for allowing control or monitoring of certain aspects of a physical location (e.g., a home, office, etc.). In the illustrated system 100, the operation of the system may include a network 102 facilitating communication between a network operations center (NOC) 104 and a control panel 106. The control panel 106 may be located at a particular physical location or structure, and can communicate with one or more automation components (ACs) 108a-108c.

Each of the ACs 108a-108c may be used to monitor or control some aspect related to the physical location being monitored. For instance, one or more of the ACs 108a-108c may be related to security. Thus, the ACs 108a-108c may include sensors that detect intruders (e.g., unauthorized opening of a door or window, motion sensors, etc.), sensors that detect smoke or fire, cameras which obtain still or video images of a location, or some other security-related component or a combination thereof. As discussed herein, the ACs 108a-108c may also be used to automate or improve efficiency of other aspects of a residence or commercial location. For instance, the ACs 108a-108c may include one or more actuators or timers for selectively turning on or off lights, HVAC components, sprinklers, or other elements. Others of the ACs 108a-108c may be used for still other purposes, including to monitor or control entertainment components (e.g., to turn on a TV or radio, to change the volume or channel of a TV or radio, etc.), to control or monitor communication systems (e.g., telephone, intercom, Internet connections, etc.), or to interact with a variety of other devices or components within a residence or commercial location.

The network 102 may be capable of carrying electronic communications. The Internet, local area networks, wide area networks, virtual private networks (VPN), other communication networks or channels, or any combination of the forgoing may be represented by the network 102. Thus, it should be understood that the network 102 may operate in any number of different manners, and can include different components, and may be distributed so as to include different components at different locations. For instance, the network 102 may include a wireless communication system such as that provided by a mobile phone provider. As an example, the control panel 106 may include a radio component to communicate with or using the network through GSM, CDMA, LTE, HSPA+ or other similar technologies used by mobile phone systems. In other embodiments, other wireless systems or even wired communication may be used. Any combination of the foregoing may also be used. Thus, while a single network 102 is illustrated, such a component may be illustrative of multiple devices or components. For instance, the network 102 may include multiple networks interconnected to facilitate communication.

The NOC 104 may be used to monitor the operation of the control panel 106 and the home automation system in which it is used. For instance, the NOC 104 may update software or firmware on the control panel 106. The NOC 104 may also monitor other aspects of the control panel 106, including its security-related functions. The NOC 104 may ensure that the control panel 106 is operating and communicating properly with security-related ACs 108a-108c. When ACs 108a-108c detect a certain event (e.g., a security-related event such as a break-in, a fire, etc.), the ACs 108a-108c may communicate the information to the control panel 106. The control panel 106 optionally reviews the information and takes a prescribed action, such as initiating an alarm, performing a corrective action, notifying an administrator or user, etc. In the same or other embodiments, information from the ACs 108a-108c may be communicated through the network 102 to the NOC 104 for some review or action.

Accordingly, in accordance with various embodiments, the NOC 104 may monitor signals that are received by the security control panel 106 from the ACs 108a-108c. For instance, if a security control panel 106 receives a signal indicative of a breach at an armed door or window of a building, the NOC 104 may be notified of such event using the control panel 106 and the network 102. The NOC 104 may then perform some security-related function (e.g., notify the police, make a telephone call to the owner of the building, etc.). Of course, the NOC 104 may provide any number of other functions, and can be distributed among multiple devices, components or facilities. The NOC 104 and control panel 106 may also work together to collectively receive, interpret and take action based on signals from the ACs 108a-108c.

As discussed above, the control panel 106 may in some embodiments be located at, or otherwise associated with, a particular location such as a residence or business. In contrast, the NOC 104 may be remote relative to such a location. At the respective locations, the control panel 106 may include a user interface (e.g., a display, a keypad, etc.) which users can use to operate, configure or otherwise interact with the control panel 106. In the same or other embodiments, an electronic device 110 may be used to interact with the control panel 106, and can be used to either provide input to or receive input from the control panel 106. For instance, the electronic device 110 may be remote from the control panel 106 and send or receive signals over the network 102. The signals may be sent to or from the control panel 106, optionally through the NOC 104, to control or monitor operation of the control panel 106 and the ACs 108a-108c so that manual operation at the control panel 106, or even physical presence at the control panel 106, is not required. In other embodiments, the electronic device 110 may communicate directly with the control panel 106 without using the network 102 (e.g., by using an electronic device in sufficient proximity to allow a hardwired or wireless connection directly to the control panel 106).

The control panel 106 may monitor the operations of a number of different systems, components or appliances. Example components include ACs 108a-108c that may be monitored by the control panel 104 to view or control entertainment, HVAC, lighting, security, sprinkler, telephone, wireless, or other systems within the location associated with the control panel 106. Such systems are merely illustrative and the ACs 108a-108c may also be related to other systems or components.

As a further example, the ACs 108a-108c may include entertainment components such as televisions, recordable media players (e.g., DVD player, Blu-Ray Player, digital video recorders, VCR, etc.), projectors, speakers, stereos, and the like. In the same or other embodiments, the ACs 108a-108c may include HVAC components such as thermostats, air conditioners, furnaces, temperature sensors, and the like, or controllers therefor. ACs 108a-108c may further include lighting system components such as light fixtures, switches, sensors (e.g., motion sensors), or additional components or controllers, or may include security system components including sensors or detectors (e.g., motion sensors, magnetic sensors, intrusion sensors, vibration sensors, infrared sensors, ultrasonic detectors, microwave detectors, contact sensors, photoelectric beam detectors, smoke detectors, temperature sensors, carbon monoxide detectors, etc.), video or still cameras, speakers, microphones, or other components. In embodiments where the ACs 108a-108c relate to a sprinkler system, the ACs 108a-108c may include valves, actuators, sensors (e.g., flow rate sensors, proximity sensors, etc.), sprinklers, pumps, and the like. In a similar manner, where one or more of the ACs 108a-108c are part of a telephone system, the ACs 108a-108c may include telephones, answering machines, call forwarding components, intercoms, and the like. Some or all of the ACs 108a-108c may also include wireless communication system components. As an example, the ACs 108a-108c may include routers, switches, access points, repeaters, bridges, and the like.

The system 100 of the present disclosure is implemented as a communication system in which the operations of electronic components can be monitored through communication links. As discussed herein, the communication links may be wired or wireless, or can include a combination of wired and wireless links, any or all of which may used different protocols or networks. Regardless of the particular mode of communication, the status or operation of devices and ACs 108a-108c can be reported to, or controlled using, the corresponding control panel 106, network operations center 104, or remote electronic device 110. The monitored ACs 108a-108c may therefore include a number of different types of components that provide or receive electronic signals of one or more different types.

By way of example, the control panel 106 may be equipped to use one or more different communication protocols in communicating with the ACs 108a-108c and the network 102, and such communication protocols may be implemented using any combination of one or more of wired or wireless communication. As an example, an example communication system 100 may include security components, of which one or more of the ACs 108a-108c may be a part. Such security components may operate using a wireless protocol or system that allows a mesh network to be formed. As shown in FIG. 1, for instance, each AC 108a-108c may optionally be able to communicate with any other AC 108a-108c, provided they are in range of each other. If the ACs 108a-108c use a wireless system for communicating with the control panel 106, an AC 108a-108c that is in range of the control panel 106 may also send information to, or receive information from, the control panel 106. In some embodiments, the ACs 108a-108c communicate with each other and the control panel 106 using the same communication protocol. Although not intended to limit the scope of the present disclosure, an example communication protocol for such an embodiment may be a low power, short range wireless communication protocol (e.g., Z-Wave, ZigBee, etc.). In other embodiments, larger range wireless communication protocols (e.g., WiFi, LightwaveRF, etc.) may be used in addition to, or instead of, the shorter range alternatives. Such connections may also allow two-way communication or may provide only one-way communication.

The control panel 106 may then communicate with the network 102 and/or the electronic device 110 using the same or other protocols. As an example, if the electronic device 110 is sufficiently close to the control panel 106, a physical connection may be used, or a suitable wireless communication protocol (e.g., Z-Wave, ZigBee, Bluetooth, WiFi, etc.) may be used.

The communication to the network 102 may also be made in any suitable manner, including using wireless or wired communication, or a combination thereof. For instance, as discussed herein, an example control panel 106 may communicate with a network 102 operating on a mobile telephone system. A GSM, CDMA, LTE, HSPA+, or other similar wireless communication component may therefore be included in the control panel 106 and the network 102 to allow for such communication. In other embodiments, the network 102 may have other forms to allow for alternative or additional types of communication between the network 102 and the control panel 106.

Figure 2:
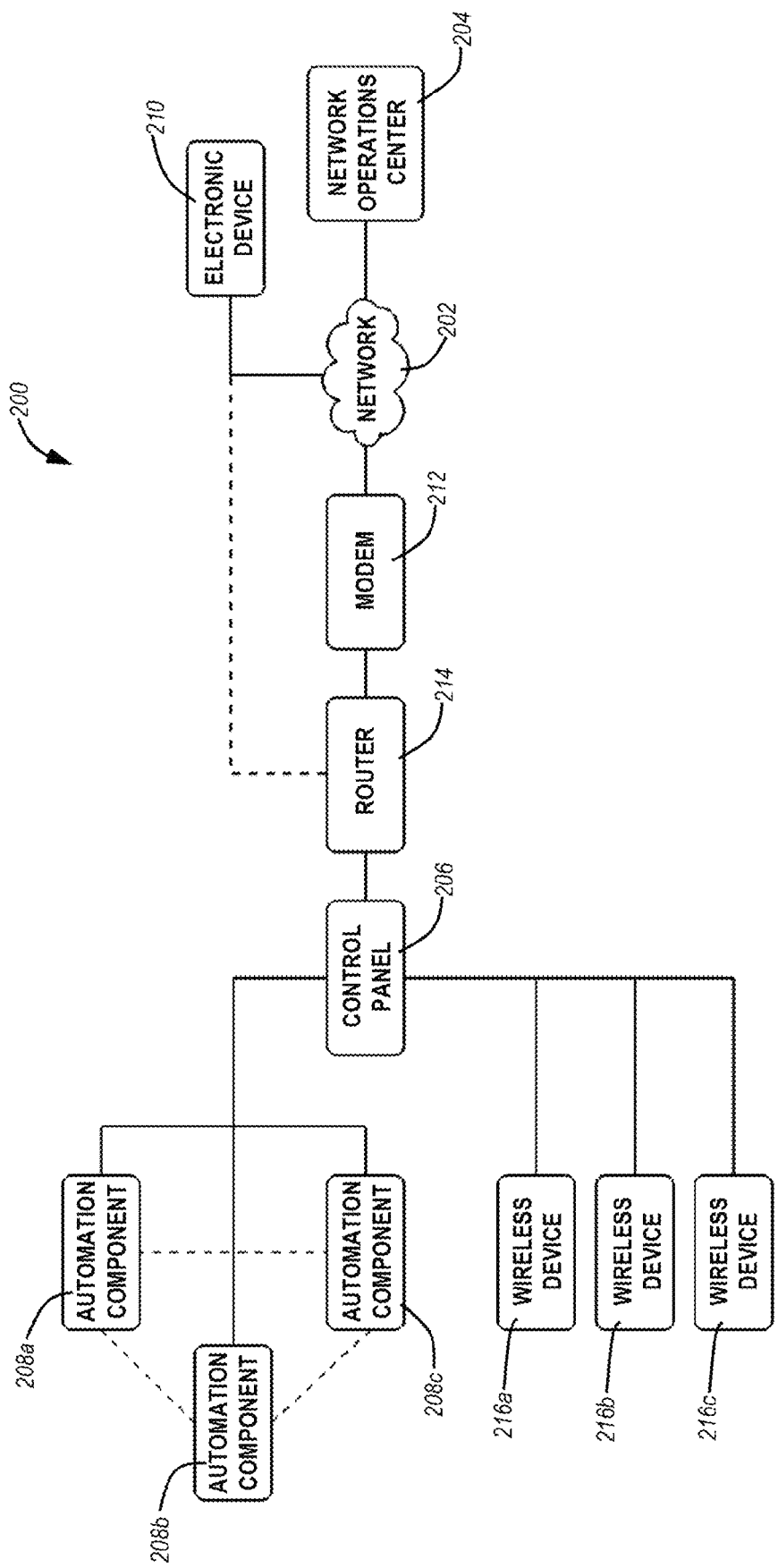
FIG. 2 is a schematic illustration of another example automation system, with a control panel acting as a wireless access point for one or more wireless devices and/or automation components, the control panel further being in communication with a network operations center through a network.

Turning now to FIG. 2, for instance, a similar communication system 200 is illustrated. The communication system 200 also includes a control panel 206 which communicates with a NOC 204 over a network 202. Optionally, an electronic device 210 may also connect to the network 202 to send or receive information to the control panel 206. One or more automation components (ACs) 208a-208c may also be in direct or indirect communication with the control panel 206 to allow the control panel 206 to control and/or monitor operation of the ACs 208a-208c.

The communication system 200 illustrates an example system in which one or more components may provide an interface between the control panel 206 and the network 202. In particular, the illustrated network 202 may include one or more networks, such as the Internet, where access thereto is controlled or provided by an Internet service provider. In such an embodiment, a modem 212 may connect to an interface provided by the Internet service provider, which interface allows the modem 212 to access the network 202. An example modem 212 may connect to a physical line leading to the network 202 (e.g., using a coaxial, CAT5, CAT7, RJ-11, RJ-45, or other jack or interface).

The modem 212 may in turn connect to a router 214. The router 214 may be used to communicate with the modem 212 and multiple devices, thereby allowing the multiple devices to use the Internet or other network 202 at the same time and/or to allow multiple devices to talk to each other. For instance, the router 214 may connect to the control panel 206, thereby providing the control panel 206 with access to the network 202. Optionally, the router 214 may also connect to the electronic device 210. The electronic device 210 may be provided access to the network 202 via the router 214 and/or may communicate with the control panel 206 through the router 214, by bypassing the network 202. Although the modem 212 and router 214 are illustrated as separate components, in other embodiments the modem 212 and router 214 may be combined into a single component (e.g., a gateway).

Another aspect of some embodiments of the present disclosure is that the control panel 206 may act as a wireless access point for multiple connections. In particular, an access point may be a device which connects to a network 202 (e.g., through router 214) and allows multiple devices to connect to the network 202 using a wireless protocol. For instance, an access point may provide a WiFi (i.e., IEEE 802.11) connection which may be used by one or more devices to connect to the network 202. FIG. 2, for instance, illustrates an example embodiment in which the control panel 206 acts as a wireless access point by allowing three wireless devices 216a-216c to wirelessly connect to the control panel 206 in order to connect to the network 202.

The wireless devices 216a-216c may take any number of forms, and can include computing devices such as desktop and laptop computers. The wireless devices 216a-216c may also include other devices. Examples of other devices which may connect wirelessly to the control panel 206 may include, but are not limited to, mobile phones (e.g., smart phones), tablet computing devices, e-readers, televisions, optical disk players (e.g., DVD, Blu-Ray, etc.), set-top boxes, GPS devices, portable media players, household appliances, video game consoles, digital picture frames, media remote controls, etc. Further, while three wireless devices 216a-216c are illustrated, there may of course be more or fewer than three wireless-capable devices connected to the control panel 206 at any given time.

Furthermore, as also illustrated in FIG. 2, the control panel 206 may be part of an automation system that includes one or more automation components (ACs) 208a-208c. Such ACs 208a-208c may perform the same or similar functions as those described with respect to FIG. 1, and may thus be related to security or other aspects of a residential or commercial location. The ACs 208a-208c may each connect to, and communicate with, the control panel 206. Such communication may occur using the control panel 206 as a WiFi access point. In such an embodiment, the ACs 208a-208c may also be WiFi-enabled. In still other embodiments, the control panel 206 may use multiple different communication protocols so as to allow some or all of the ACs 208a-208c to use a different communication protocol relative to the wireless devices 216a-216c. For instance, the ACs 208a-208c may communicate with each other and the control panel 206 using a short-range and/or low-power wireless communication protocol (e.g., Z-Wave, ZigBee, etc.) while the control panel 206 also acts as a wireless access point to the wireless devices 216a-216c using a larger-range protocol such as WiFi. The control panel 206 may thus be enabled to use multiple different protocols to communicate with downstream components such as the ACs 208a-208c and the wireless devices 216a-216c.

Figure 3:
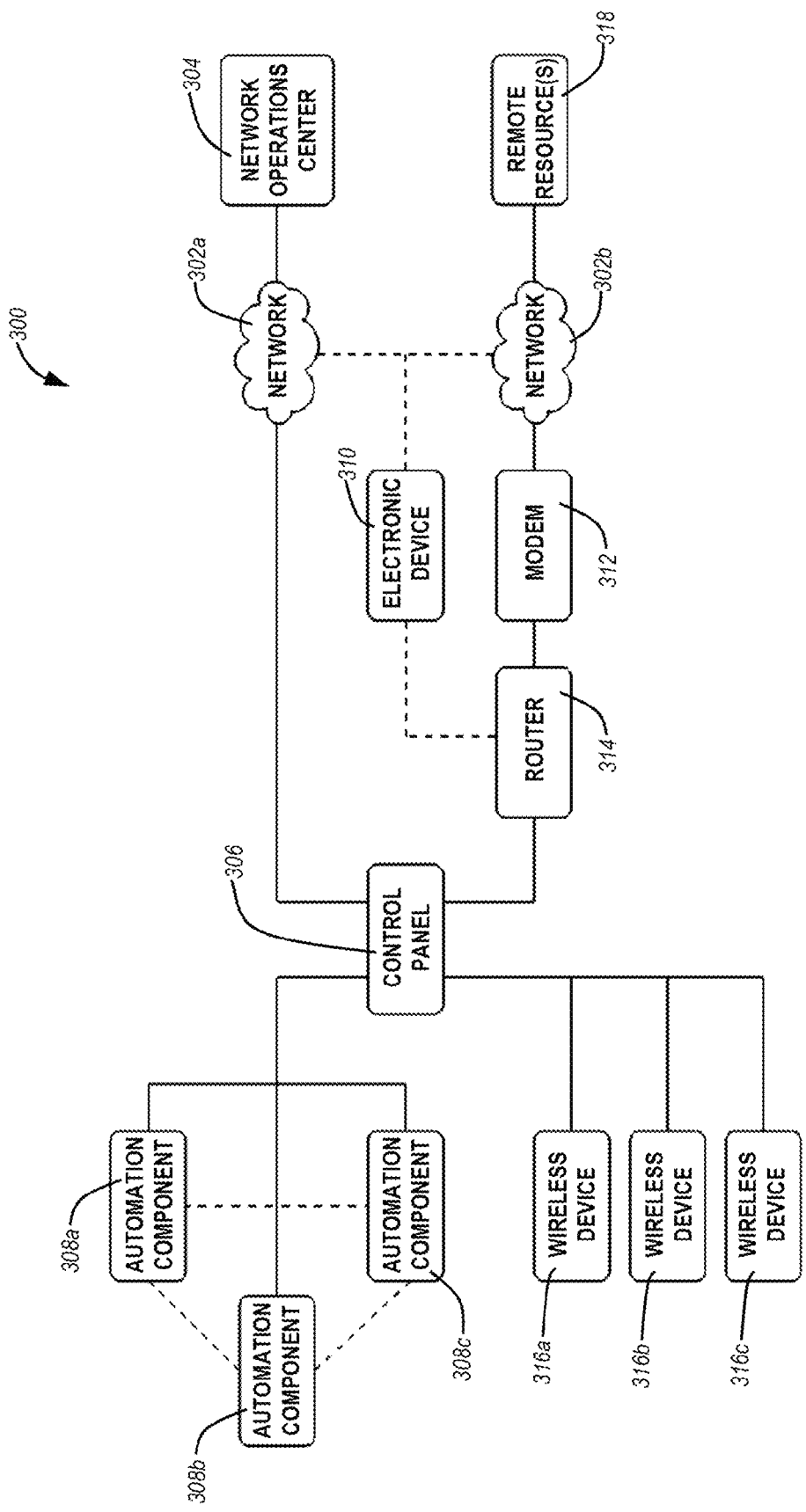
FIG. 3 is a schematic illustration of still another example automation system that includes a control panel for use as a wireless access point, the control panel being capable of communication with a network operations center and a remote server through one or more networks.

In the same or other embodiments, a control panel may also be able to use multiple different communication protocols and systems to communicate with one or more communication networks using the same or different protocols. FIG. 3, for instance, illustrates an example communication system 300 that includes a control panel 306 in communication with two communication networks 302a, 302b.

More particularly, the control panel 306 may be a security or other automation system control panel monitoring and/or controlling one or more sensors, cameras, or other automation components (ACs) 308a-308c. In monitoring the ACs 308a-308c, the control panel 306 may communicate through a network 302a with a network operations center (NOC) 304. The network 302a and the NOC 304 may operate as discussed elsewhere herein. For instance, in one example embodiment, the network 302a may include a mobile telephone network and the control panel 306 may communicate with the network 302 using a wireless protocol for a telephone network. Of course, other protocols and systems may be used in other embodiments.

The control panel 306 may also communicate with a second network 302b. The second network 302b may provide access to additional information that is separate from the NOC 304. For instance, one or more remote resources 318 may be accessed through the network 302b. The remote resources 318 may include servers, databases, and other resources, or any combination thereof. In one embodiment, the network 302b includes the Internet and the remote resources 318 may include resources which provide information or services over the Internet.

According to some embodiments, the network 302a may be used to access the remote resources 318. As shown in FIG. 3, for instance, the network 302a may be connected to the network 302b, thereby allowing the control panel 306 to access the remote resources 318 through the network 302a. In other embodiments, however, the control panel 318 may be able to access the remote resources 318 by bypassing the network 302a. In the illustrated embodiment, the control panel 306 may connect to the network 302b through a modem 312 and/or router 314. In some cases, access to the remote resources 318 may be provided at higher speed or with greater accessibility or reliability relative to access through the network 302a, although the opposite may also be true. In accordance with some embodiments, the networks 302a, 302b may provide redundant access to the remote resources 318.

Although not necessary, some embodiments of the present disclosure contemplate using the various networks 302a, 302b primarily for a single function. As shown in FIG. 3, for instance, the control panel 306 may connect to a set of automation components (ACs) 308a-308c which can include security or other automation components for a residential or commercial property. The network 302a may communicate with a NOC 304 which can monitor or respond to events at the ACs 308a-308c, and the network 302a may be utilized wholly or primarily for communicating automation-related information between the NOC 304 and the control panel 306.

As also discussed herein, the control panel 306 may in some embodiments be used as a wireless access point to provide one or more wireless devices 316a-316c with access to desired resources. Optionally, the information the wireless devices 316a-316c can access are available through the Internet, a WAN, a LAN, an intranet, or other network which is represented by 302b. The information that is accessible may be stored or provided by the remote resources 318. The network 302b may be wholly or primarily used in communicating data for the wireless devices 316a-316c that use the control panel 306 as a wireless access point.

It should also be appreciated in view of the disclosure herein, that there may be cross-over in the operation and use of the networks 302a, 302b with the control panel 306. For instance, as discussed herein, the networks 302a, 302b may be in communication so as to allow the control panel to use one or both of the networks 302a, 302b to access the NOC 304 or the remote resources 318. Optionally, the multiple networks 302a, 302b, which may use different communication components or protocols, are primarily used for a particular function but may redundantly provide access to the NOC 304 and/or remote resources 318 using a different network 302a, 302b in the event of a communication or hardware failure.

In accordance with some embodiments of the present disclosure, the system 300 of FIG. 3 may therefore be a distributed communication system in which multiple protocols and communication systems may be used by a control panel of an automation system. Indeed, the control panel 306 of FIG. 3 may use up to four or more different communication systems to send or receive information. More particularly, the control panel 306 may use one communication system to communication with the NOC 304 (e.g., a mobile telephone network), and a separate communication system to communicate with the ACs 308a-308c that are monitored by the NOC 304 (e.g., Z-Wave, ZigBee, LightwaveRF, etc.). Still another communication system may be used to access the network 302b and/or the Internet (e.g., a cable, DSL, satellite, or other Internet service provider network). As a wireless access point, the control panel 306 may then use still another communication protocol (e.g., WiFi) to communicate with the downstream wireless devices 316a-316c.

The above example of four different systems is, however, merely illustrative. For instance, some or all communication paths of the control panel 306 may use the same or similar communication systems or protocols. By way of illustration, the control panel 306 may wirelessly couple to the router 314 using the same or a different protocol as that used for the wireless devices 316a-316c or ACs 308a-308c, to act as a wireless repeater and/or access point for the router 314. Moreover, some or all of the ACs 308a-308c and/or wireless devices 316a-316c may use different communication protocols relative to each other in order to communicate with the control panel 306.

Optionally, an electronic device 310 may communicate with the control panel 306 (e.g., through a network 302a, 302b, through the router 314, directly, etc.) in order to send information to, or receive information from, the control panel 306. The electronic device 310 may, for instance, be a mobile or remote device that can be used to permit a user to remotely control or view the status of the ACs 308a-308c. For instance, a home owner on vacation may use the electronic device 310 to request the control panel 306 cause a light to be turned on, change a sprinkler timer, identify the source of an alarm notice received, and the like. One or more of the ACs 308a-308c may be responsible for causing the action to be performed or responsible for the notice received.

FIGS. 1-3 each illustrate example systems in which a control panel 306 may be used to provide the dual-purposes of control and monitoring of an automation system, and to provide a wireless access point for one or more wireless devices and/or automation components. In general, the descriptions of FIGS. 1-3 are intended to build upon each other, such that except where operation of the various systems are expressly described as being incompatible, the features and aspects of each of the systems of FIGS. 1-3 may be interchangeably with each other to provide an automation system and wireless access point.

Figure 4:
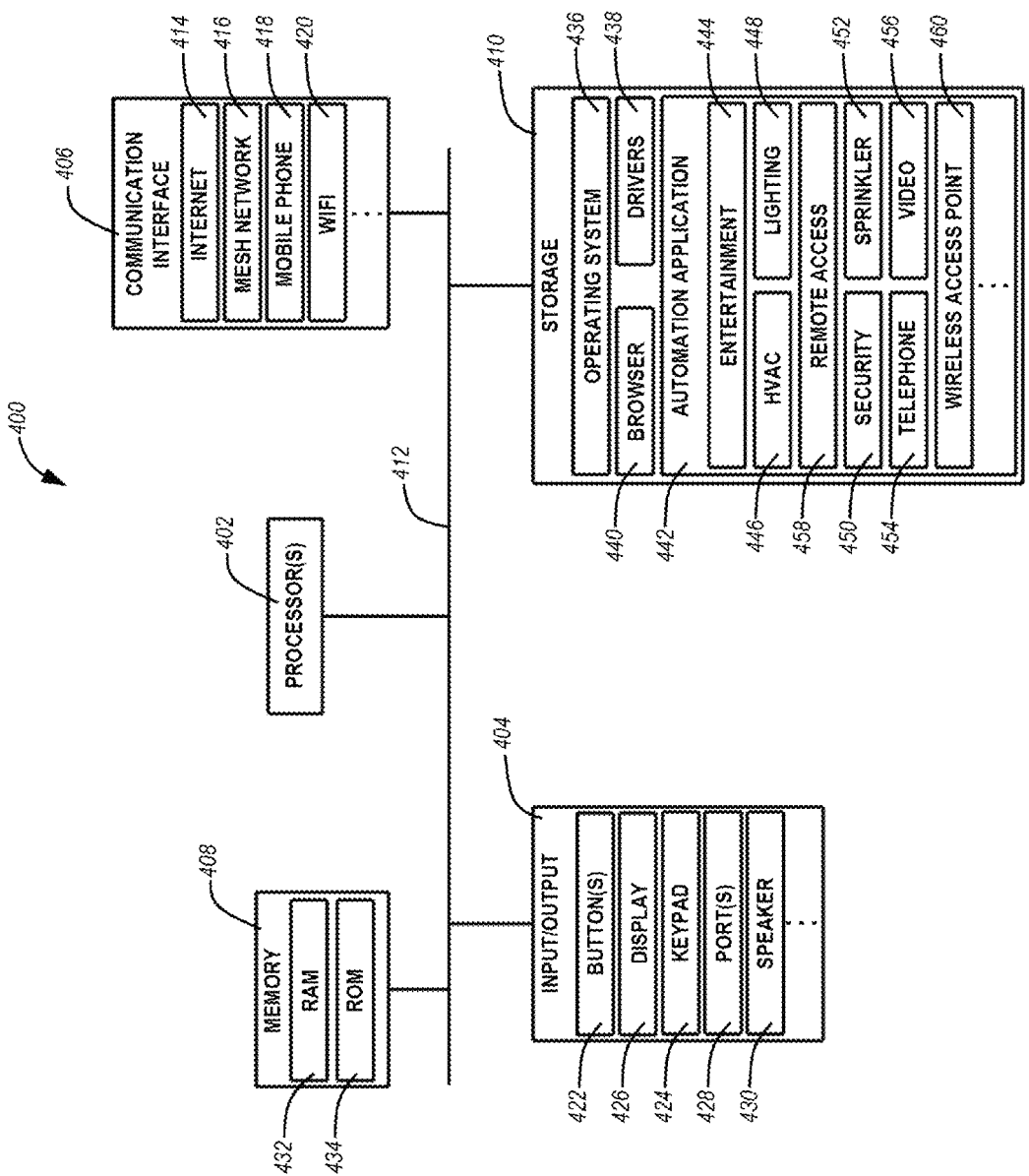
FIG. 4 schematically illustrates a control panel that may be used as an access point and to communicate with one or more automation components, in accordance with one embodiment of the present disclosure.

Turning now to FIG. 4, an example control panel 400 is schematically illustrated. It should be appreciated in view of the disclosure herein that the control panel 400 may be used in any of the systems of FIGS. 1-3 in connection with security or other automation services and/or to provide a wireless access point by which wireless-enabled devices may connect to a network such as the Internet. The illustrated control panel 400 is, however, merely illustrative, and may have other components or elements other than those expressly described or illustrated, or may be used in connection with other systems besides those of FIGS. 1-3 or combinations thereof.

In FIG. 4, the control panel 400 includes multiple components interacting together over one or more communication channels. In this embodiment, for instance, one or more processors 402 may communicate with input/output devices 404, a communication interface 406, memory 408 and/or a mass storage device 410 via a communication bus 412. The processors 402 may generally include one or more processing components, including a central processing unit, a graphics processing unit, or the like, any of which may be capable of executing computer-executable instructions received or stored by the control panel 400.

The processors 402 may communicate with the communication interface 406 using the bus 412. The communication interface 406 may receive or send communications via one or more networks (e.g., networks 302a, 302b of FIG. 3) or otherwise communicate with other components or devices (e.g., automation components 308a-308c and/or wireless devices 316a-316c of FIG. 3). Received communications may be provided over the bus 212 and processed by the processor 202.

In the particular embodiment illustrated in FIG. 4, the communication interface 406 may include multiple components to allow communication via one or more different protocols. For instance, the illustrated embodiment includes an interface component 414 for connecting to a network such as the Internet. As discussed herein, an example of the interface component 414 may include a port for connecting to a cable, DSL, satellite, or other link provided by an Internet service provider. Through such a port or component, the control panel 400 may access the Internet or another global or similar network for the sending or receiving of communications.

Another communication interface component 416 illustrated in FIG. 4 may be configured for use with a mesh network. For instance, a security or other automation system for a home or office may include one or more sensors, controllers, and the like. Such components may be enabled to communicate in a mesh network through one or two-way radios. Example radios may operate using Z-Wave, ZigBee, or other protocols, or some combination thereof. In one embodiment, the interface component 416 may communicate with some or all of the components using a similar radio or other device.

In still another example embodiment, an example communication interface 416 may include an interface component 418 for communicating over a mobile telephone network. An example network may include, for instance, GSM, CDMA, LTE, HSPA+, or other communication typically used by a wireless carrier to communicate with a mobile device such as a telephone or tablet computing device. As discussed above, in one example embodiment, the interface component 418 may be provided to facilitate communication between the control panel 400 and a network operations center (e.g., NOC 304 of FIG. 3).

In still another embodiment, the communication interface 406 may include a component 420 for use in providing other wireless communication. An example component 420 may be used to send and/or receive communications over a wireless protocol such as WiFi (i.e., IEEE 802.11). Moreover, according to some embodiments as disclosed herein, the WiFi component 420 may be configured to allow the control panel 400 to function as a wireless access point. Thus, wireless-enabled devices (e.g., wireless devices 316a-316c of FIG. 3) may be able to connect to the WiFi component 420 to access a desired network. In the embodiment shown in FIG. 4, the control panel 400 may access still other network or components (e.g., using the components 414-418), and wireless devices communicating with the WiFi component 420 may be able to send information to or from other devices connected to the control panel 400 using such components 414-418.

According to some embodiments, the control panel 400 may further include one or more input/output devices 404. In FIG. 4, the input/output devices 404 may communicate with one or more processors 402 using the communication bus 412. Any suitable types of input/output devices may be provided. For instance, the illustrated input/output devices 404 may include one or more buttons 422 or keypads 424 by which input may be received from a user. A display 426 may also be provided and used as an output to display information to a user. In some embodiments, the display 426 may also act as an input. For instance, the display 426 may be a touch-sensitive display allowing a user to touch the display 426 to make a selection, to provide input through a gesture, or otherwise provide input. Still other types of input or output devices may include one or more ports 428 and/or speakers 430. The illustrated input/output devices 404 of a control panel 400 are merely illustrative. In other embodiments, for instance, a microphone, trackball, mouse, camera, biometric reader (e.g., iris scanner, fingerprint reader, etc.), GPS device, or other component, or some combination of the foregoing, may be included.

The control panel 400 may also include memory 408 and mass storage 410. In general, the memory 408 may include one or more of persistent and non-persistent storage, and in the illustrated embodiment the memory 408 is shown as including random access memory 432 and read only memory 434. Other types of memory or storage may also be included.

The mass storage 410 may generally be comprised of persistent storage in a number of different forms. Such forms may include a hard drive, flash-based storage, optical storage devices, magnetic storage devices, or other forms which are either permanently or removably coupled to the control panel 410. In some embodiments, an operating system 436 defining the general operating functions of the control panel 400, and which is executed by the processors 402 may be stored in the mass storage 410. Other components stored in the mass storage 410 may include drivers 438 (e.g., to facilitate communication between the processors 402 and the input/output devices 404 and/or components of the communication interface 406), a browser 440 (e.g., to access or display information obtained over a network, including mark-up pages and information), and application programs.

Application programs may generally include any program or application that may be used in the operation of the control panel 400. Examples of application programs may include applications specifically designed for use with a security and/or automation system (e.g., automation application 442), or more general use applications. Examples of more general use applications can include word processing applications, spreadsheet applications, games, calendaring applications, weather forecast applications, sports scores applications, and other applications.

As shown in FIG. 4, in at least one embodiment, the automation application 442 may include modules or components capable of being used by the control panel 400 in connection with a security or automation system. For instance, the automation application 442 may include an entertainment module 444. The entertainment module 444 may generally be used to control how entertainment-related components of an automation system operate. Such components may include audio and/or visual components. For instance, if the control panel 400 is used in connection with an automation system that includes a television, speaker system, or the like, the entertainment module 444 may be used to monitor or control volume levels, channels, environmental settings, or the like.

An additional application or module within the automation application 442 may include an HVAC module 446. The HVAC module 446 may generally be provided to control, monitor or interface with an HVAC system that includes a thermostat, air conditioner, furnace, hot water heater, or other similar components. A lighting module 448 may have similar functions, but can instead control, monitor or interface with lighting components including switches, lighting fixtures, and the like.

The modules 450-456 may provide similar functions, but for different systems monitored using the control panel 400. By way of example, a security module 450 may control, monitor, or interface with security-related components such as intrusion detection components, cameras, global positioning system (GPS) components, and safety components (e.g., fire, flood, carbon monoxide or radon detectors). A sprinkler module 452 may be used to automate a sprinkler system, monitor operation of the system (e.g., verify water flow rates at one or more locations), and the like. A telephone module 454 can be used to interface with a telephone system. For instance, if a user is away from a residential or commercial location, the telephone module 454 may communicate with the telephone system to automatically forward calls, route them to another person, or the like. A video module 456 may be used in connection with video functions within a security and/or automation system. The video module 456 may monitor video feeds from security cameras, interface with video entertainment devices, or provide other video-related functions, or any combination of the foregoing.

As also shown in FIG. 4, the automation application 442 optionally includes a remote access module 458. The remote access module 458 may allow the control panel 400 to be accessed using remote devices (e.g., device 310 of FIG. 3), and to potentially have communications relayed through the control panel 400 either from or to the remote device. Thus, a user of a remote device could potentially set or view entertainment, HVAC, lighting, security, sprinkler, telephone, video or other settings remotely, or even monitor audio or video feeds from a desired location. Of course, the automation application 442 may also include additional or other modules or components, including authentication, settings, preferences, emergency override, updating, and other modules.

Indeed, another example module is a wireless access point module 460 as shown in FIG. 4. In accordance with at least one embodiment, the control panel 400 may act as a wireless access point to provide network connectivity to a plurality of wireless-enabled components. As discussed previously, an example communication interface component 420 may be provided as the hardware used to send and/or receive WiFi signals. The wireless access point module 460 may be used to configure the WiFi component 420. For instance using the wireless access point module 460, a user may be able to configure settings such as the SSID, channel, and other settings used by an access point to connect to a network and/or wireless devices using the access point to communicate with the network.

In one embodiment, the control panel 400 of FIG. 4 may be used to provide an intuitive and integrated interface by which a user can monitor or control multiple systems and components within a home or commercial automation system. For instance, the control panel 400 may use the automation application 442 to set or view the status of one or more security, lighting, HVAC, or other components which may be connected to the control panel 400 via one or more components of the communication interface 406 (e.g., through the mesh network component 416). The display device 426 may provide information which can be easily viewed by the user, or the user may access the information through a separate device making use of the remote access module 458.

Moreover, rather than using a separate wireless access point, which access point may require configuration through a separate computing device, the control panel 400 may provide a convenient and simplified interface through which the wireless access point (which may be the control panel 400 itself) can be set-up with a router or other network device and used to send a wireless signal that may communicate with wireless-enabled devices.

Figure 5:
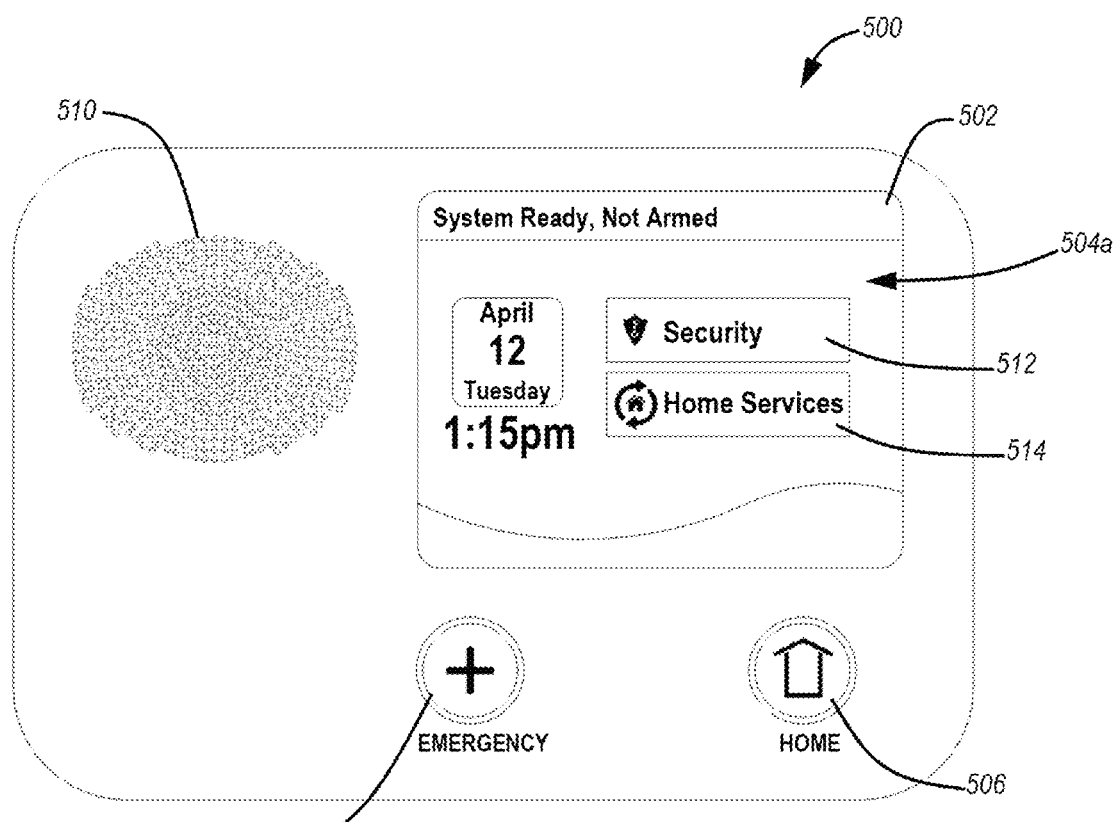
FIG. 5 illustrates an automation system control panel having a user interface with a display enabled to access security and other systems.

FIGS. 5-8 illustrate example interfaces of a control panel 500 that incorporates a display 502 that may be operated in accordance with embodiments of the present disclosure. As shown in FIG. 5, the display 502 may display an interface 504a. In accordance with some embodiments of the present disclosure, the interface 504a may include a view presented by software, firmware, or other components stored on computer readable media in the control panel 500, or otherwise accessible thereto. The interface 504a may be used to display information relevant to operation of the control panel 500 and/or components or devices connected thereto.

For instance, in the illustrated embodiment, the interface 504a may generally represent a home interface in which various options are available to a user. For instance, the interface 504a may change as a user selects different options. If, however, the user wants to return to the home interface 504a, the user may select a corresponding home option. The illustrated embodiment includes, for instance, a touch-sensitive home button 506 that, when depressed or touched, may cause the display 502 to provide the interface 504a.

Of course, other buttons or elements may be provided to display or provide other interfaces. As an example, the illustrated control panel 400 may also include an emergency button 508. When such a button is touched or depressed, the control panel 400 may display a corresponding emergency interface (not shown) on the display 502. In some cases, pressing the emergency button 508 may cause the control panel 500 to contact a remote party such as an emergency response provider (e.g., police, fire, medical, hospital, etc.) or a network operations center. One or two-way communication with the remote provider can be facilitated by an audio component 510 as well as by communication systems (e.g., telephone connections, wireless communication, VOIP, etc.) within the control panel 500. The audio component 510 may include a speaker and/or microphone component. Thus, communication may occur using the control panel 500 and/or an alarm may be sounded. Of course, the audio component 510 may also be used for other purposes. A speaker of the audio component 510 may play music or other audio (e.g., for use as part of an entertainment system, corresponding to video displayed on the display 502, as part of an intercom system, etc.).

In this particular embodiment, the home interface 504a may allow a user to select between a security option 512 and a home services option 514. Such selection may be made by using one or more buttons, a keypad, or the like. The display 502 may also be touch-sensitive to allow a user to touch a location of the display 502 corresponding to either option 512, 514. Of course, the particular content and form of the home interface 504a may vary as desired. In this embodiment, for instance, the home interface 504a also displays information such as a date and time, a status of a security system, and the like. In other embodiments, different or additional information may be provided.

Figure 6:
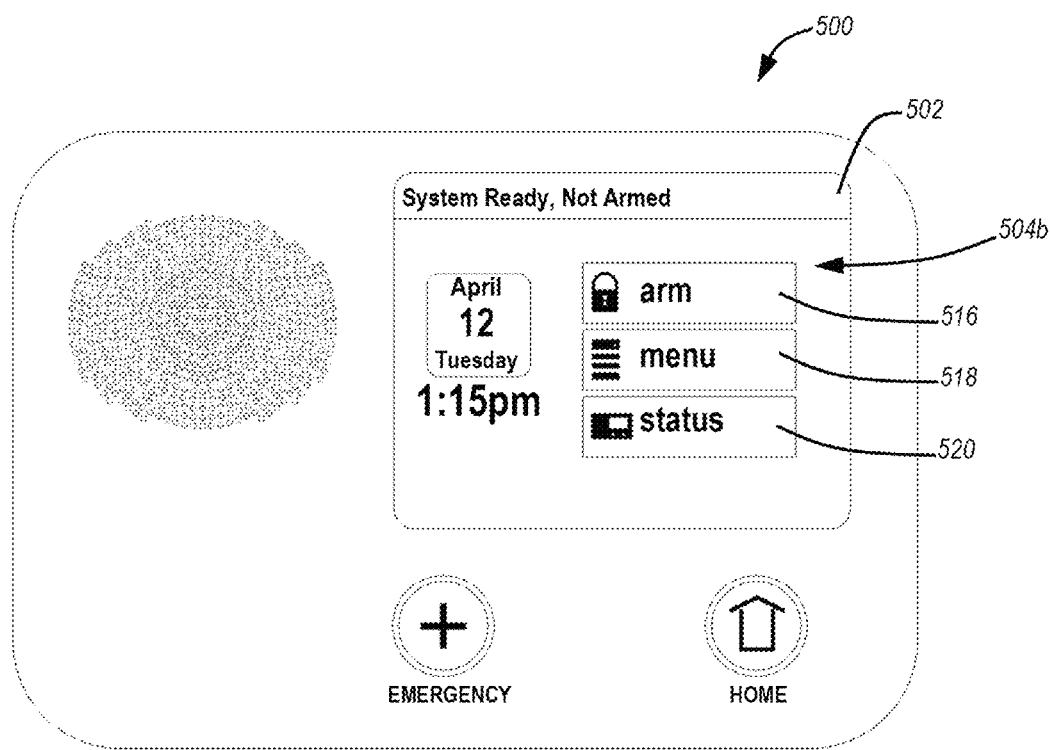
FIG. 6 illustrates the automation system control panel of FIG. 4, the display including security-related options.

Turning now to FIG. 6, the control panel 500 is shown in another aspect. More particularly, the illustrated control panel 500 includes the display 502 with a security interface 504b shown. The security interface 504b may be presented when a user provides a particular input to the control panel 500. As discussed herein, the input may be provided through any suitable input component, including a button, keypad, touch-screen, or other component, or some combination thereof. In accordance with one embodiment, the security interface 504b may be presented in response to selection of a security input on a prior interface (e.g., home interface 504a of FIG. 5).

The interface 504b of FIG. 6 may be configured to provide one or more options for which a user may make a selection by providing a corresponding input. For instance, as discussed herein, a user can tap the display 502 to select a corresponding option (e.g., option 516 to arm a security system or component, option 518 to view a security-related menu, or option 520 to view the status of the security system, control panel 500, or components connected thereto).

Figure 7:
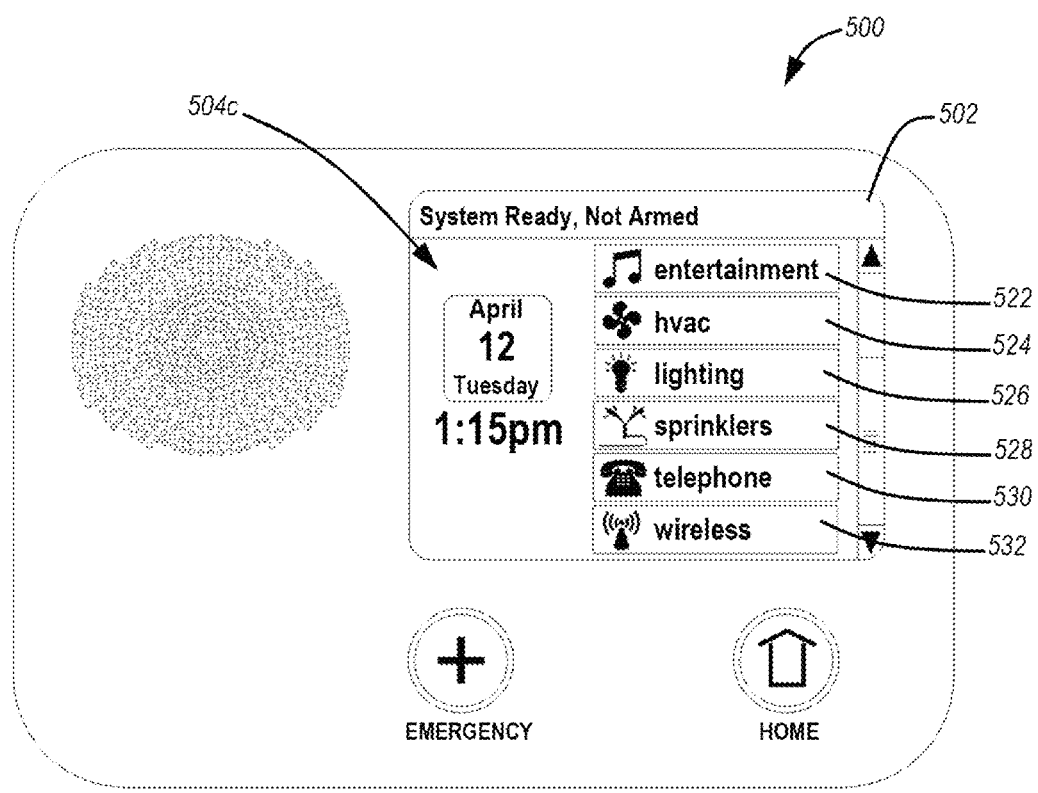
FIG. 7 illustrates the automation system control panel of FIG. 4, the display including non-security options, including options for managing a wireless system.

The control panel 500 may, however, be used for services in addition to, or instead of, security. As discussed above with respect to FIG. 5, for instance, a user may select one or more other options (e.g., using home services option 514 of FIG. 5). FIG. 7 illustrates the control panel 500 where the display 502 includes a home services interface 504*c* that may be used to select, view, configure, control, monitor, or otherwise interact with one or more other components or systems other than a security interface. By way of illustration only, additional services provided through the control panel 500 and the interface 504*c* may include entertainment, HVAC, lighting, sprinkler, telephone, or wireless services. Each service may be accessed using a corresponding option 522-532. Moreover, still other options may also be provided. Indeed, the illustrated embodiment shows the options 522-532 within a scrolling menu which may allow still additional or other services to be provided.

Figure 8:
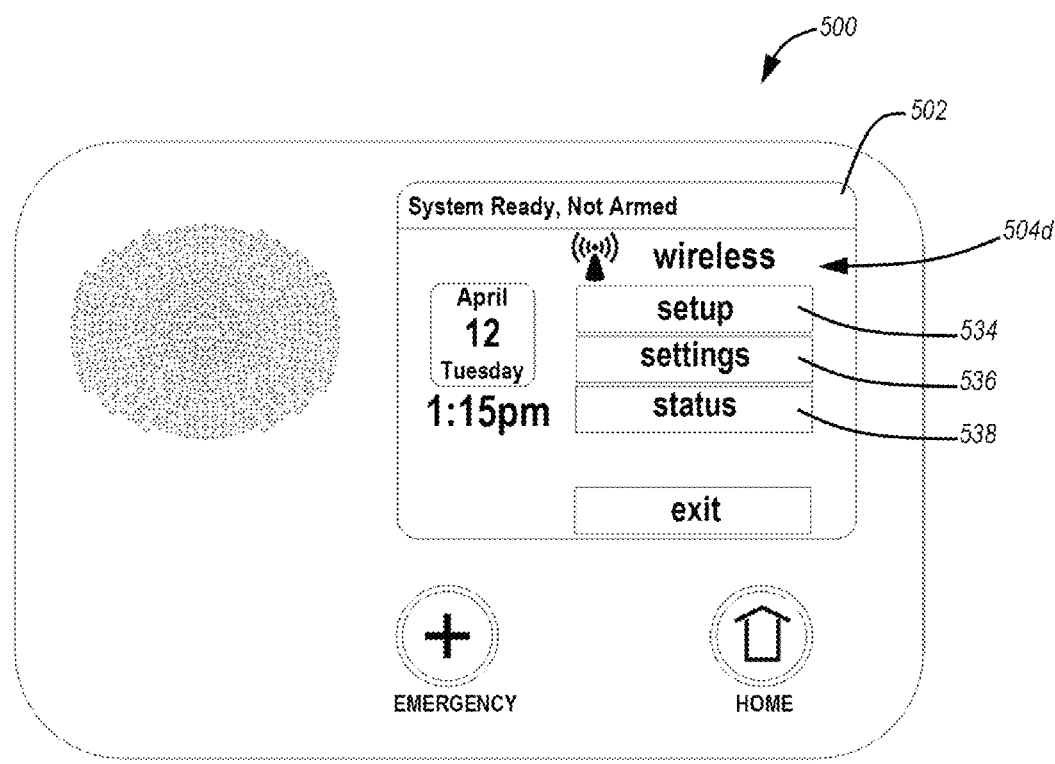
FIG. 8 illustrates the automation system control panel of FIG. 4, the display including a wireless menu for managing wireless settings and capabilities of the control panel.

The manners in which the control panel 500 may interact with components and systems used to provide some of the identified services are beyond the scope of the present disclosure, and would be further understood by one of ordinary skill in the art in view of the disclosure herein. Nevertheless, in view of the novel aspects of using a control panel for a home automation system to provide services as a wireless access point, FIG. 8 illustrates still another example embodiment of the control panel 500. In FIG. 8, the control panel 500 displays an interface 504*d* for use in the setup, configuration or other use of the control panel 500 as a wireless access point. In one embodiment, the interface 504*d* is displayed in response to selection of a corresponding wireless option (e.g., option 532 of FIG. 7) that may be provided by the control panel 500.

In this particular embodiment, a user may use the display 502 to view the interface 504*d* and optionally select one or more options 534-538 related to use of the control panel 500 as a wireless access point. More particular, the illustrated options 534-548 include options that include, but are not limited to, the setup, settings, or status of the wireless access point.

If the user selects the option 534 to setup the control panel 500 as a wireless access point, the user may be directed to still another interface (not shown) that can be presented on the display 502. The interface may allow the user to enter (e.g., using a physical or virtual keypad) certain information corresponding to the wireless access point and/or the network to which the control panel 500 is connected. Information such as the SSID, may be provided. The setup interface may also allow a user to enter other information such as security information (e.g., type of security, password, etc.), DHCP configurations (e.g., IP address for the control panel 500, IP address range for devices connecting to the WiFi component of the control panel 500, etc.), LAN settings (e.g., IP address, subnet mask address, gateway address, DNS server information, etc.), and the like. Still other information may be specified directly on the control panel 500, including wireless settings related to the channel and/or band to be used, the wireless mode in which the control panel 500 operates (e.g., as an access point, bridge, repeater, client, router, etc.), whether or not the SSID is broadcast, the DHCP client range, etc. Any or all of the same or other information may be viewed and optionally changed using the settings option 536 of the interface 504*d*.

An optional status option 538 may provide a user with the ability to view or change still other information. For instance, the control panel 500 may include a firewall component. The status option 538, when selected, may display a user interface (not shown) indicating whether or not the firewall is turned on. Still other options displayed using the status option 528 may include information on what addresses are being used, what devices are connected to the wireless access point, what network requests have been made (e.g., a history), what type of signal quality or bandwidth is available, the status of the connection to a router, and the like.

Figure 9:
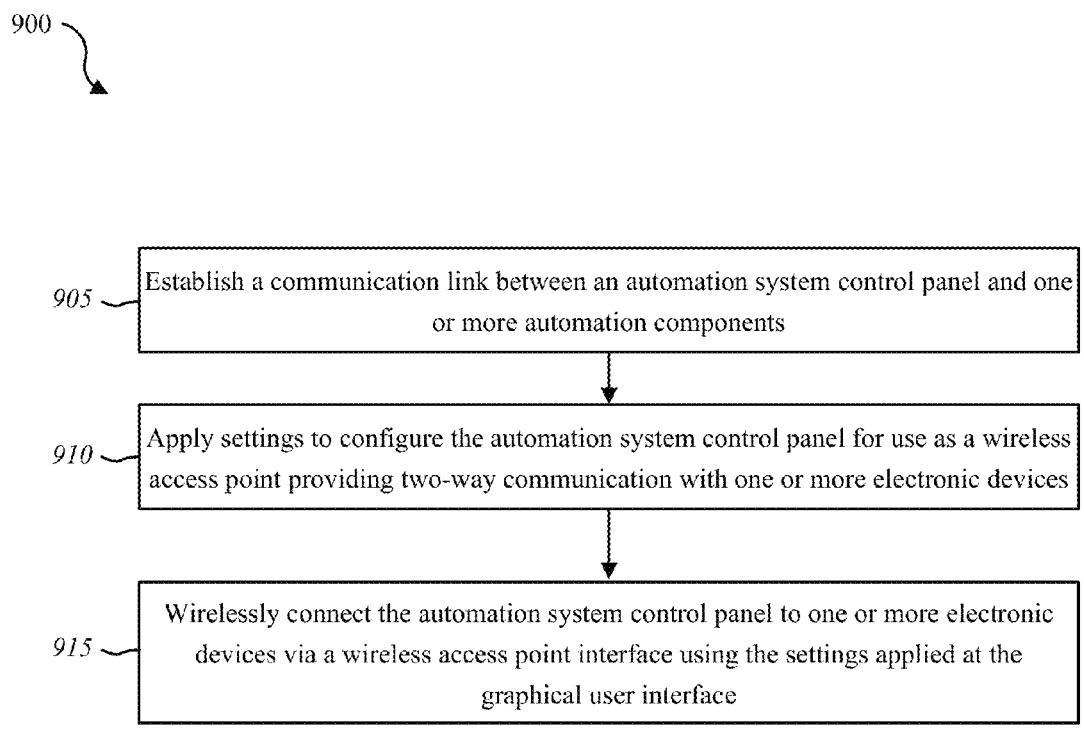
FIG. 9 is a flow diagram illustrating one embodiment of a method for using a control panel as an access point.

Turning now to FIG. 9, a flow diagram illustrating one embodiment of a method 900 for using a control panel as an access point is illustrated. In some configurations, the method 900 may be implemented in conjunction with one or more elements from system 100 of FIG. 1. At block 905, may be established a communication link between an automation system control panel and one or more automation components. At block 910, may be applied settings to configure the automation system control panel for use as a wireless access point providing two-way communication with one or more electronic devices. In some cases, applying settings includes receiving input directly at a graphical user interface of the automation system control panel, the graphical user interface further providing access to control the one or more automation components. At block 915, may be wirelessly connected the automation system control panel to one or more electronic devices via a wireless access point interface using the settings applied at the graphical user interface.

Embodiments of the present disclosure may comprise or utilize a special purpose or general-purpose computer including computer hardware, such as, for example, one or more processors and system memory. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the disclosure can comprise at least two distinctly different kinds of computer-readable media, including at least computer storage media and/or transmission media.

Examples of computer storage media include RAM, ROM, EEPROM, CD-ROM or other optical disk storage, magnetic disk storage or other magnetic storage devices, flash-based storage, solid-state storage, or any other non-transmission medium which can be used to store desired program code means in the form of computer-executable instructions or data structures and which can be accessed by a general purpose or special purpose computer.

When information is transferred or provided over a communication network or another communications connection (either hardwired, wireless, or a combination of hardwired or wireless) to a computing device, the computing device properly views the connection as a transmission medium. A "communication network" may generally be defined as one or more data links that enable the transport of electronic data between computer systems and/or modules, engines, and/or other electronic devices, and transmissions media can include a communication network and/or data links, carrier waves, wireless signals, and the like, which can be used to carry desired program or template code means or instructions in the form of computer-executable instructions or data structures within, to or from a communication network. Combinations of storage media and transmission media should also be included within the scope of computer-readable media.

Further, upon reaching various computer system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise instructions and data which, when executed at a processor, cause a general purpose computer, dedicated or special purpose computer (e.g., an automation system control panel), or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, programmable logic machines, multi-processor systems, microprocessor-based or programmable consumer electronics, network PCs, tablet computing devices, minicomputers, security system control panels, security system network operations centers, mainframe computers, mobile telephones, PDAs, pagers, routers, switches, and the like.

Embodiments may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

Those skilled in the art will also appreciate that embodiments of the present disclosure may be practiced in special-purpose, dedicated or other computing devices integrated within or particular to a particular residence, business, company, government agency, or other entity, and that such devices may operate using a network connection, wireless connection, or hardwire connection. Examples may include residential or commercial buildings in connection with security or other automation systems configured to monitor local conditions (i.e., at the same building or location), remote conditions (i.e., at a different building or location), or some combination thereof.

Although the foregoing description contains many specifics, these should not be construed as limiting the scope of the disclosure or of any of the appended claims, but merely as providing information pertinent to some specific embodiments that may fall within the scopes of the disclosure and the appended claims. Various embodiments are described, some of which incorporate differing features. Any feature illustrated or described relative to one embodiment is interchangeable and/or may be employed in combination with features of any other embodiment herein. In addition, other embodiments may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed is:

1. A control panel located within a structure associated with a security system or an automation system, comprising:
    a housing;
    one or more processors for controlling operation of the control panel for at least one of the security system or the automation system, the one or more processors carried within the housing;
    a first communication interface for enabling the control panel to connect to a plurality of wireless devices as a wireless access point, the first communication interface carried by or within the housing, and configured to provide the plurality of wireless devices access to a communication network accessible through the first communication interface, the communication network allowing communication between the plurality of wireless devices and simultaneously access to the Internet for each wireless device of the plurality of wireless devices based on a type of each wireless device and a distance between the control panel and each wireless device within the structure;
    a second communication interface for communicatively coupling the one or more processors to the communication network, and configured to send security-related functions to the plurality of wireless devices, the second communication interface being carried by or within the housing;
    a third communication interface for communicatively coupling the one or more processor to a network of security or automation components; and
    a graphical user interface carried by the housing and in communication with the one or more processors for enabling, by applying settings directly at the graphical user interface of the control panel, control of the first communication interface and the security system or the automation system.

2. The control panel of claim 1, wherein the communication network includes one or more of a cable, DSL, or satellite connection to an Internet service provider.

3. The control panel of claim 1, wherein the first communication interface uses a WiFi protocol.

4. The control panel of claim 1, wherein the first and second communication interfaces use different communication protocols.

5. The control panel of claim 1, further comprising the third communication interface for coupling the one or more processors to a mesh network of security system or automation components.

6. The control panel of claim 5, wherein the second communication interface uses one or more of a mesh network protocol or a mobile telephone system protocol.

7. The control panel of claim 1, further comprising:
receiving, via the first communication interface, information associated with the structure from at least one wireless device of the plurality of wireless devices;
detecting, via the one or more processors, an event based at least in part on the received information; and
sending, via the second communication interface, a security function to the at least one wireless device based at least in part on the detecting.

8. An automation system, comprising:
at least one automation component for a security system or building automation system; and
a control panel located within a structure associated with the automation system and dedicated for use in controlling or monitoring the at least one automation component, wherein the control panel includes:
a housing;
one or more processors carried within the housing;
a first communication interface comprising a wireless access point interface for wirelessly connecting the control panel to a plurality of WiFi-enabled devices and connecting the plurality of WiFi-enabled devices to a communication network, the communication network allowing communication between the plurality of WiFi-enabled devices and simultaneously access to the Internet for each WiFi-enabled device of the plurality of WiFi-enabled devices based on a type of each wireless device and a distance between the control panel and each wireless device within the structure;
a second communication interface for communicatively coupling the one or more processors to the communication network, and configured to send security-related functions to the plurality of WiFi-enabled devices;
a third communication interface for communicatively coupling the one or more processor to a network of automation components; and
a graphical user interface carried by the housing and in communication with the one or more processors for enabling, by applying settings directly at the graphical user interface of the control panel, control of the wireless access interface and the at least one automation component.

9. The automation system of claim 8, wherein the at least one automation component is a security-related automation component.

10. The automation system of claim 9, wherein the plurality of WiFi-enabled devices are provided access to the Internet service provider through the wireless access point interface and the router or modem.

11. The automation system of claim 8, wherein the control panel further includes a mobile telephone network interface connecting the control panel to the mobile telephone network.

12. The automation system of claim 11, wherein the mobile telephone network interface provides the control panel access to a network operations center.

13. The automation system of claim 8, wherein the graphical user interface includes a display configured to display setup or configuration information corresponding to the wireless access point interface.

14. The automation system of claim 13, wherein the control panel further includes an input for the control panel to receive setup or configuration information corresponding to the wireless access point interface directly at the control panel.

15. The automation system of claim 8, further comprising:
receiving information associated with the structure from at least one WiFi-enabled device of the plurality of WiFi-enabled devices; and
detecting an event based at least in part on the received information.

16. The automation system of claim 15, further comprising:
sending a security function to the at least one WiFi-enabled device based at least in part on the detecting.

17. A method for providing wireless access to one or more wireless devices using an automation system control panel located within a structure, comprising:
establishing a first communication link for communicatively coupling the automation system control panel to a network of security or automation components located within the structure;
applying settings to configure the automation system control panel for use as a wireless access point providing two-way communication with one or more electronic devices, wherein applying settings includes receiving input directly at a graphical user interface of the automation system control panel, the graphical user interface further providing access to control the one or more automation components;
establishing a second communication link based on configuring a wireless access point interface via the input received directly at the graphical user interface;
wirelessly connecting the automation system control panel to the one or more electronic devices and connecting the one or more electronic devices to a communication network via the wireless access point interface, the communication network allowing communication between the one or more electronic devices and the one or more automation components, and simultaneously access to the Internet for each electronic device and automation device based on a type of each electronic device or automation component and a distance between the control panel and each electronic device or automation component within the structure; and
sending security-related functions to the one or more electronic devices via a third communication link.

18. The method of claim 17, wherein wirelessly connecting the automation system control panel to one or more electronic devices includes establishing a WiFi connection.

19. The method of claim 17, further comprising:
receiving information associated with the structure from the one or more automation components; and
detecting an event based at least in part on the received information.

20. The method of claim 16, further comprising:
sending a security function to the one or more automation components based at least in part on the detecting.

* * * * *